Nov. 10, 1931.   S. D. WHITE ET AL   1,831,614
GEAR LUBRICANT
Filed May 14, 1930   2 Sheets-Sheet 2
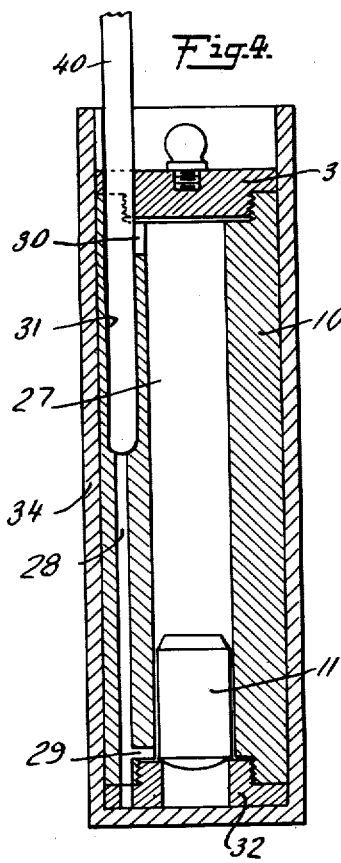
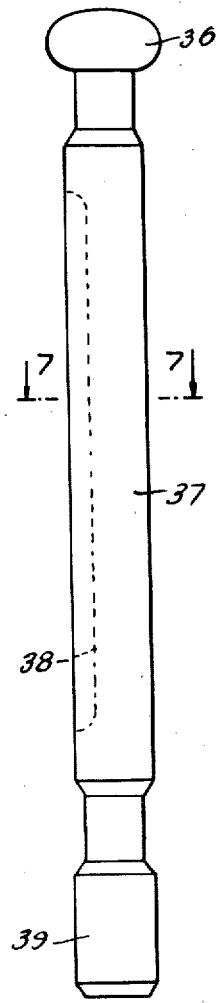
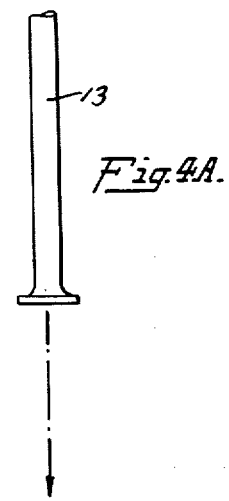
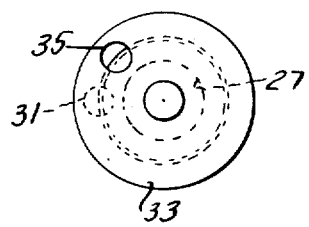
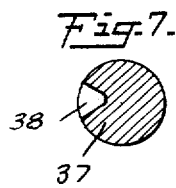
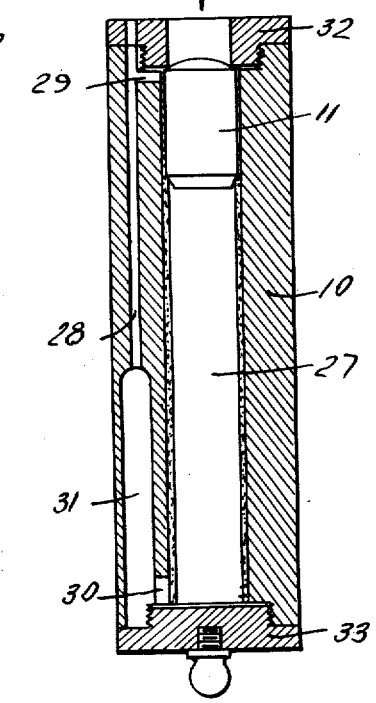
INVENTOR
Stanley D. White
Carl L. Knopf
BY
Pennie, Davis, Marvin & Edmonds
ATTORNEYS Patented Nov. 10, 1931

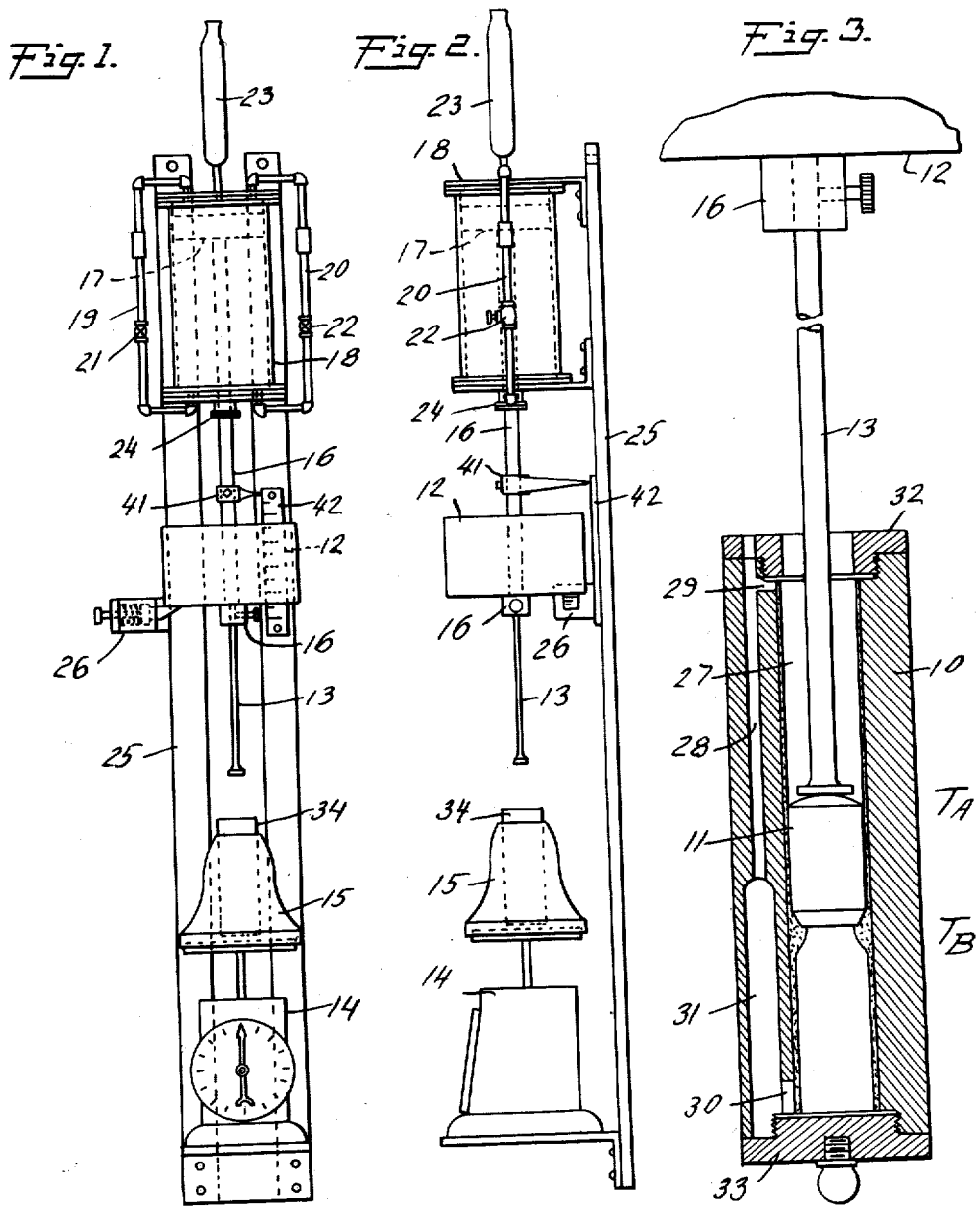

1,831,614

UNITED STATES PATENT OFFICE

STANLEY D. WHITE AND CARL L. KNOPF, OF CHICAGO, ILLINOIS, ASSIGNORS TO SIN-CLAIR REFINING COMPANY, OF NEW YORK, N. Y., A CORPORATION OF MAINE

GEAR LUBRICANT

Application filed May 14, 1930, Serial No. 452,293, and in Canada June 11, 1929.

This invention relates to improvements in gear lubricants intended particularly for use in transmissions and differentials in automobile machinery. The invention provides an improved gear lubricant of special value in such application. This improved gear lubricant has a number of important advantages, among the more important of which is the ability of the new lubricant to operate satisfactorily over a wide range of temperatures.

The invention also includes, in addition to the improved lubricant product, certain improvements in manufacturing methods.

One of the most difficult lubrication problems presented in the operation of automobile machinery is the lubrication of transmissions and differentials. In the early days of the automobile, the automobile was not usually expected to be in service twelve months of the year; automotive engineering had not progressed this far, the closed body had not been developed to its present stage, and with but few exceptions highways were not passable for the automobile but for a limited season. As a consequence, this problem of lubrication was then largely confined to meeting conditions of moderate and hot weather. As mechanical and body design progressed, making the automobile more and more useful through all twelve months of the year, a number of make-shift lubricants were employed for the lubrication of transmissions and differentials to met the increasing range of temperatures encountered in automobile operation, but hitherto the best solution of the problem has been to use one type of lubricant in hot weather and another type of lubricant in cold weather. The disadvantages of the thus imposed requirement for manufacture and distribution of two types of lubricants for the same purpose are obvious. In addition to multiplication of manufacturing operations and duplication of stocks, this situation has involved a tremendous annual expenditure for repairs and replacement due to faulty or improper lubrication.

For operation throughout the year, a gear lubricant for use in the transmissions and differentials of automobile machinery must, essentially, retain its lubricating characteristics at temperatures as high as 100° F. or somewhat higher and at temperatures as low as 0° F. or somewhat lower and throughout the intervening range and must also satisfy several other, less fundamental but nevertheless important, requirements. For example, the burden of lubrication in differentials is usually higher than in transmissions which would simplify the problem with respect to transmissions except that reasonable ease of shifting transmission gears must also be maintained throughout the range of operating temperatures.

The improved gear lubricant of the present invention consists essentially of an oxidized blend, substantially free from water, of light lubricating oil, heavy flux oil and sodium soaps of petroleum acids, the latter particularly in the form of caustic bottoms from the distillation of lubricating oils from Gulf coast type stocks over caustic soda, this blend in a particularly advantageous form of the invention having a Saybolt viscosity under a pressure of 90 pounds per square inch not exceeding 2600 or better 2500 seconds at 100° F. and not less than 140 seconds at 210° F. or a MacMichael viscosity of 55-100 or better 85-95 poises at 100° F., a Knopf viscidity not exceeding 12-13 ounces at 0° F. and a Knopf adhesiveness not exceeding 75 ounces at 0° F. The Saybolt viscosity under pressure or the MacMichael viscosity and the Knopf viscidity are more important than the Knopf adhesiveness. A petroleum lubricant blend having a viscosity, viscidity and adhesiveness just specified over the temperature range just specified is apparently entirely novel. The improved lubricant of the invention consists generally about one-half of light lubricating oil, about one-third of heavy flux oil and about one-sixth of caustic bottoms, the blend being partially oxidized as by air blowing. The improved lubricant of the invention may comprise, advantageously, a blend 65–88% or better 83–85% of a mixture of light lubricating oil and heavy flux oil in proportions such that the composite has a Saybolt viscosity of 55–62 seconds at 210° F. and 12–35% or better 15–17% of caustic bottoms of the type mentioned above having a Knopf viscidity of 15–35 or better 15–25 ounces at 100° F., the blend being blown with air at elevated temperature, 250–300° F., until the Saybolt viscosity under 90 pounds per square inch pressure at 100°F. approximates 2600 seconds or the MacMichael viscosity at 100° F. of the resulting composite approximates 55–100 or better 85–100 poises and the Knopf viscidity 4–13 ounces at 0° F.

The improved gear lubricant of the present invention functions properly over a wide temperature range and is satisfactory for use throughout the year, in winter as well as in summer. Its use eliminates, for the operator of automobile machinery, any necessity for changing the transmission and differential lubricant with change of season and, for the manufacturer and distributor, the making and handling of a plurality of lubricants for the same purpose. It has a viscidity low enough to permit easy shifting of transmission gears, even at temperatures as low as 0° F. or lower. It is sufficiently adhesive to feed properly in gear sets and maintain effective lubricating films, particularly in differentials, even at high temperatures, up to 100–120° F. or higher. It has a low drag resistance thus involving a minimum of power loss and promoting easy starting. It does not channel, permitting gears to run dry, even at temperatures as low as 0° F. or lower. It is non-corrosive. It has sufficient body to minimize any leakage from gear housings, even at high temperatures.

For the determination of viscosities at temperatures in the neighborhood of 100° F., of this type of lubricant, the standard MacMichael torsion viscosimeter is satisfactory. This viscosity determination may also be made with the standard Saybolt Universal viscosimeter following standard procedure except for the maintenance of a fixed super-atmospheric pressure, 90 pounds per square inch for example, within the tube from which the lubricant undergoing test is discharged. Such pressure may be maintained by compressed air supplied under controlled conditions using a pressure cover for the tube. For the determination of viscidity and adhesiveness at low temperatures, the usual types of instruments are not satisfactory. The Knopf viscosimeter and the Knopf adherometer are reliably accurate in the testing of this type of lubricant at low temperatures.

The foregoing therefore refers to these modes of measurement. These two last-mentioned instruments are illustrated, diagrammatically, in the accompanying drawings and are described in more detail in Letters Patent No. 1,748,512 and No. 1,748,513, issued to Sinclair Refining Company, February 25, 1930, on applications of one of us Carl L. Knopf.

A standard automobile transmission and a standard automobile differential with openings cut in the gear housings to permit observation, arranged within a thermostat chamber and connected with an electric motor and pony brake, to be driven at appropriate speeds under appropriate loads, were used in the development of the improved lubricant of this invention. This apparatus permitted the direct observation of the action of the lubricants studied over a wide range of temperatures. A stroboscope was also used in connection with this apparatus to permit the study of formation and maintenance of lubricant films in the gear sets by direct observation.

Tested in the apparatus just mentioned, the deficiencies of the usual lubricants were more immediately apparent than in actual use. Without exception, those usual lubricants which were satisfactory at high temperature were deficient at low temperature and vice versa; for example, lubricants which maintained satisfactory lubricating films and were of good body at high temperature became so viscid at low temperature as to channel or to make the shifting of transmission gears difficult if not impossible; while those sufficiently fluid at low temperature failed to provide proper lubrication at high temperature because of lack of body or sufficient adhesiveness to feed in the gear sets.

Tests in the apparatus just mentioned checked by tests in actual service have established ranges of viscosity, viscidity and adhesiveness for petroleum blend lubricants intended for use in the transmissions and differentials of automobile machinery over which ranges satisfactory operation throughout the year and over the entire range of operating temperatures encountered is assured. Petroleum lubricant blends having a Saybolt viscosity under 90 pounds per square inch pressure not exceeding 2500–2600 seconds at 100° F. and a Saybolt viscosity under 90 pounds per square inch pressure not less than 140 seconds at 210° F or a MacMichael viscosity of 55–100 or better 85–95 poises at 100° F., a Knopf viscidity of 4–13 ounces or not exceeding 12–13 ounces at 0° F. and, advantageously, a Knopf adhesiveness of 20–75 ounces or not exceeding 75 ounces at 0° F. are of special value for this purpose. This invention provides a petroleum blend lubricant satisfying these requirements, the requirements of actual service.

A gear lubricant embodying the invention, and the manufacture of this gear lubricant, is illustrated by the following example: Light Gulf coast lubricating oil having a Saybolt viscosity of 100 seconds at 100° F. is thoroughly blended with a heavy Gulf coast flux oil having a Saybolt viscosity of 1000–5000 seconds at 210° F. in proportions to produce a base blend having a Saybolt viscosity of 55–62 seconds, 57 seconds for example, at 210° F. This base blend is then heated to a temperature at which it is freely fluid, 250–275° F. for example, and caustic bottoms from the redistillation of Gulf coast lubricating oils over caustic soda preheated to a corresponding temperature are then gradually blended with the base blend. Thorough mixing is essential. Using caustic bottoms having a Knopf viscidity of 20 ounces at 100° F., about 20% of caustic bottoms on the base blend is usually required. If the viscidity of the caustic bottoms is less a somewhat increased proportion of caustic bottoms is used, and vice versa. The composite stock is then heated approximately to 300° F. and blown with air until the resulting product has a Saybolt viscosity under 90 pounds per square inch pressure of about 2600 seconds at 100° F. or a MacMichael viscosity of 85–100 poises at 100° F. and a Knopf viscidity of approximately 10 ounces at 0° F. The temperature during this operation is best limited not to exceed 300° F. to prevent excessive oxidation. The period of oxidation usually approximates 4–8 hours. The air applied during the oxidation operation is with advantage previously dried, for example by passage through a calcium chloride drier. If water is present in the base blend prior to admixture of the caustic bottoms, it is also advantageous to blow this base blend with dried air to dehydrate it prior to admixture of the caustic bottoms. The finished product is then run to storage. The finished product is also, with advantage, stored in an atmosphere substantially free from water. Cooling of the finished product is with advantage limited to a slow rate.

If the oxidized composite, when tested, is insufficiently viscous or viscid, the viscosity and viscidity are increased by prolonging the oxidizing operation. If the viscosity and viscidity of the composite product, when tested, are too high, the viscosity and viscidity can be reduced within a limited range by the addition of increments of the base blend. When the base blend is added to the composite at this stage of the manufacturing operation, the resulting composite blend is best held at a temperature in the neighborhood of 300° F. for 2–3 hours or longer. Again, thorough mixing is essential.

A reduction in viscosity and viscidity of the lubricant product usually takes place during storage, a drop in a MacMichael viscosity from 85 to 75 or from 100 to 90 poises at 100° F. over a period of 90 days for example being not unusual, and for this reason it is best in manufacture to approximate higher viscosities and viscidities in the ranges mentioned. If, on aging, the viscosity of the lubricant product drops too far, these values can be restored by reheating the product or by repeating the oxidizing operation. The stability of the lubricant product is dependent, largely if not entirely, upon thorough mixing of the several components of the composite product.

In some cases the stability of the lubricant product may be improved, if thorough mixing is not otherwise effected, by passing the composite following the oxidizing operation through a grinding mill or dispersion mill. This treatment tends to involve an abnormal initial reduction in viscosity and viscidity and where it is used it is usually advantageous to bring the composite to a more viscous and more viscid condition before subjecting it to this treatment.

The light lubricating oils useful in the composition of the invention include the class comprising the light and medium oils commonly used for the lubrication of automobile internal combustion motors. The heavy flux oils useful in the composition of the invention include the class comprising the residues produced in the distillation of crude petroleums for the manufacture of lubricating residues. Light lubricating oils and heavy flux oils from the Gulf coast or Gulf coast type stocks and crudes are particularly advantageous as components of the composition of the invention.

The caustic bottoms from the distillation or redistillation of lubricating oils over caustic alkali, particularly lubricating oils from Gulf coast or Gulf coast type stocks or crudes, are particularly useful in the composition of the invention. These caustic bottoms include sodium soaps of petroleum acids, probably naphthenic acids, and very heavy lubricating oil constituents in admixture; their efficacy is apparently due primarily to the particular soaps present enhanced, probably, by the associated lubricating oil constituents. In any event, these caustic bottoms are specially valuable as components of the lubricant product of the invention. Caustic bottoms containing sulphonated or sulphated compounds such as are produced in the caustic treatment of oils following treatment with sulphuric acid, apparently lack the qualities requisite for use in the composition of the present invention. The caustic bottoms first referred to above are those produced in the common practice in the distillation of lubricating oils, particularly Gulf coast lubricating oils, in which practice the oils are not subjected to treatment with sulphuric acid prior to the treatment or distillation with caustic soda.

In the accompanying drawings, Figs. 1 and 3 are front and side elevations, respectively, of an assembled instrument for measuring Knopf viscidity and Knopf adhesiveness, Fig. 3 is a fragmentary detail of the apparatus used for measuring Knopf viscidity and Fig. 4 is a fragmentary detail of the apparatus used for measuring Knopf adhesiveness.

The instrument illustrated in the drawings comprises a holder 10 for receiving and holding the viscidity test receptacle or the adhesiveness test receptacle, a plunger driving mechanism comprising a shaft 11 passing through gland 12 and connected to piston 13 within cylinder 14 and carrying a driving weight 15, and a weighing mechanism 16 carrying the holder 10, all carried on a unitary frame 17. The opposite ends of the cylinder 14 are connected by a pair of pipes 18 and 19, a gate valve 20 being provided in pipe 18 and a needle valve 21 in pipe 19. An open riser 22 is also connected to the upper end of the cylinder 14. A catch 23 is provided for holding the plunger mechanism in a raised position. The holder 10 is of thermal insulating material to assist in maintaining the temperature of samples constant during the test.

In operation to determine the values either of viscidity or of adhesiveness as specified above the limiting rate of drop of the plunger mechanism, with the plunger or push rod 24 in position, is first brought to a standard rate of 4″ in 26–27 seconds by adjusting the needle valve 21 with the gate valve 20 closed, the cylinder 14 being filled with light lubricating oil, under a driving weight of 50 pounds.

In carrying out the Knopf viscidity test, a seamless steel receptacle 25, of circular cross-section 1.3″ in diameter, is filled to a depth of 4½″ with the lubricant to be tested, the charged receptacle then brought to a standard temperature of 0° F. and inserted in the holder 10, and the plunger mechanism, carrying a plunger 24a with a flat circular head ½″ in diameter and 1/16″ thick carried by a shank ¼″ in diameter is released. As soon as the load imposed on the weighing mechanism 16 by the motion of the plunger 24a through the lubricant reaches a substantially constant value, usually in 5–8 seconds after entering the lubricant, small weights equalling this load are placed on the large weight 15. A reading of the load on the weighing mechanism 16 is then taken as the plunger head passes a point ½″ above the center of the body of the lubricant and again when the plunger head passes a point ½″ below the center of the body of lubricant (see points A and B in Fig. 3) and these readings are averaged to give the Knopf viscidity.

In carrying out the Knopf adhesiveness test, a receptacle 26 and a plunger 34 are used. This receptacle comprises a cylinder with an accurately dimensioned bore 27 which is ⅝″ in diameter, a vent opening 28 running through the wall of the receptacle and communicating with the ends of the bore through apertures 29 and 30, one end of the vent being enlarged to form a thermometer well 31, and removable end members 32 and 33 screwed into seats in the ends of the cylinder. This plunger has a body portion ⅞″ long and 0.003″ less in diameter than the bore 27, an advancing end ⅛″ long, the edge of which is tapered at 30°, and an end adapted to contact with the push rod 24b of spherical section on a ½″ radius. The plunger 24a used in making the viscosity test may be used as the push rod 24b in making the adhesiveness test.

In carrying out the Knopf adhesiveness test, the receptacle 26 and the plunger 34 are chilled in a chilling cup to the standard temperature of 0° F., withdrawn from the chilling cup and a film of the lubricant to be tested is applied to the interior of the bore 27 and brought to a standard thickness of 0.003″ by passing a sizing plunger 0.006″ less in diameter than the bore therethrough, the plunger 34 is coated with the lubricant and inserted in the end of the bore 27 adjacent the seat for cover 32 with the advancing end in, the covers 32 and 33 screwed in place, the assembled receptacle then replaced in the chilling cup and brought to the standard temperature of 0° F., withdrawn from the chilling cup and inserted in the holder 10 with the end of the bore containing the plunger 34 up and the plunger mechanism released. As soon as the load imposed on the weighing mechanism 16 by the motion of the plunger 34 through the bore 27 reaches a substantially constant value, usually in 5–8 seconds after its motion begins, small weights equalling this load are placed on the large weight 15. A reading of the load imposed upon the weighing mechanism 16 is then made as the plunger passes two points adjacent the midpoint of its travel through the bore (see points C and D in Fig. 4) and these readings are averaged to give the Kopf adhesiveness.

This application is in part a continuation of our application Serial No. 300,538, filed August 18, 1928, which has matured into Patent No. 1,789,614, issued January 20, 1931.

We claim:

1. An improved gear lubricant consisting essentially of an oxidized blend of light lubricating oil, heavy flux oil and sodium soaps of petroleum acids substantially free from water, said blend having a MacMichael viscosity of 85–95 poises at 100° F. and a Knopf viscidity not exceeding 12–13 ounces at 0° F.

2. An improved gear lubricant consisting essentially of an oxidized blend of light lubricating oil, heavy flux oil and sodium soaps of petroleum acids substantially free from water, said blend having a Saybolt viscosity under 90 pounds per square inch pressure not exceeding 2600 seconds at 100° F. and a MacMichael viscosity of 85-95 poises at 100° F. and a Knopf viscidity not exceeding 12-13 ounces at 0° F.

3. An improved gear lubricant consisting essentially of an oxidized blend of light lubricating oil, heavy flux oil and sodium soaps of petroleum acids substantially free from water, said blend having a Saybolt viscosity under 90 pounds per square inch pressure not exceeding 2600 seconds at 100° F. and not less than 140 seconds at 210° F. and a MacMichael viscosity of 85-95 poises at 100° F. and a Knopf viscidity not exceeding 12-13 ounces at 0° F.

4. An improved gear lubricant consisting essentially of an oxidized blend of light lubricating oil, heavy flux oil and sodium soaps of petroleum acids substantially free from water, said blend having a MacMichael viscosity of 85-95 poises at 100° F., a Knopf viscidity not exceeding 12-13 ounces at 0° F. and a Knopf adhesiveness not exceeding 75 ounces at 0° F.

5. An improved gear lubricant consisting essentially of an oxidized blend of light lubricating oil, heavy flux oil and caustic bottoms from the distillation of lubricating oil over caustic soda, said blend being substantially free from water and having a MacMichael viscosity of 85-95 poises at 100° F. and a Knopf viscidity not exceeding 12-13 ounces at 0° F.

6. An improved gear lubricant consisting essentially of an oxidized blend of light lubricating oil, heavy flux oil and caustic bottoms from the distillation of lubricating oil over caustic soda, said blend being substantially free from water and having a Saybolt viscosity under 90 pounds per square inch pressure not exceeding 2600 seconds at 100° F. and not less than 140 seconds at 210° F. and a MacMichael viscosity of 85-95 poises at 100° F. and a Knopf viscidity not exceeding 12-13 ounces at 0° F.

7. An improved gear lubricant consisting essentially of an oxidized blend of light lubricating oil, heavy flux oil and caustic bottoms from the distillation of lubricating oil over caustic soda, said blend being substantially free from water and having a MacMichael viscosity of 85-95 poises at 100° F., a Knopf viscidity not exceeding 12-13 ounces at 0° F. and a Knopf adhesiveness not exceeding 75 ounces at 0° F.

8. An improved gear lubricant consisting essentially of an oxidized blend of a mixture of light lubricating oil and heavy flux oil having a Saybolt viscosity of 55-62 seconds at 210° F. and caustic bottoms from the distillation of lubricating oil over caustic soda, said blend being substantially free from water and having a MacMichael viscosity of 85-95 poises at 100° F. and a Knopf viscidity not exceeding 12-13 ounces at 0° F.

9. An improved gear lubricant consisting essentially of an oxidized blend of a mixture of light lubricating oil and heavy flux oil having a Saybolt viscosity of 55-62 seconds at 210° F. and caustic bottoms from the distillation of lubricating oil over caustic soda, said blend being substantially free from water and having a Saybolt viscosity under 90 pounds per square inch pressure not exceeding 2600 seconds at 100° F. and not less than 140 seconds at 210° F. and a MacMichael viscosity of 85-95 poises at 100° F. and a Knopf viscidity not exceeding 12-13 ounces at 0° F.

10. An improved gear lubricant consisting essentially of an oxidized blend of light lubricating oil, heavy flux oil and caustic bottoms from the distillation of Gulf coast type lubricating oil over caustic soda, said blend being substantially free from water and having a MacMichael viscosity of 85-95 poises at 100° F. and a Knopf viscidity not exceeding 12-13 ounces at 0° F.

11. An improved gear lubricant consisting essentially of an oxidized blend of light lubricating oil, heavy flux oil and caustic bottoms from the distillation of Gulf coast type lubricating oil over caustic soda, said blend being substantially free from water and having a Saybolt viscosity under 90 pounds per square inch pressure not exceeding 2600 seconds at 100° F. and not less than 140 seconds at 210° F. and a MacMichael viscosity of 85-95 poises at 100° F. and a Knopf viscidity not exceeding 12-13 ounces at 0° F.

12. An improved gear lubricant consisting essentially of an oxidized blend of light lubricating oil, heavy flux oil and caustic bottoms from the distillation of Gulf coast type lubricating oil over caustic soda, said blend being substantially free from water and having a MacMichael viscosity of 85-95 poises at 100° F., and a Knopf viscidity not exceeding 12-13 ounces at 0° F. and a Knopf adhesiveness not exceeding 75 ounces at 0° F.

13. An improved gear lubricant consisting essentially of an oxidized blend of a mixture of light lubricating oil and heavy flux oil having a Saybolt viscosity of 55-62 seconds at 210° F. and caustic bottoms from the distillation of Gulf coast type lubricating oil over caustic soda, said blend being substantially free from water and having a MacMichael viscosity of 85-95 poises at 100° F. and a Knopf viscidity not exceeding 12-13 ounces at 0° F.

14. An improved gear lubricant consisting essentially of an oxidized blend of a mixture of light lubricating oil and heavy flux oil having a Saybolt viscosity of 55-62 seconds at 210° F. and caustic bottoms from the distillation of Gulf coast type lubricating oil over caustic soda, said blend being substantially free from water and having a Saybolt viscosity under 90 pounds per square inch pressure not exceeding 2600 seconds at 100° F. and a MacMichael viscosity of 85-95 poises at 100° F. and not less than 140 seconds at 210° F. and a Knopf viscidity not exceeding 12-13 ounces at 0° F.

In testimony whereof we affix our signatures.

STANLEY D. WHITE.
CARL L. KNOPF.

210° F. and caustic bottoms from the distillation of Gulf coast type lubricating oil over caustic soda, said blend being substantially free from water and having a Saybolt viscosity under 90 pounds per square inch pressure not exceeding 2600 seconds at 100° F. and a MacMichael viscosity of 85-95 poises at 100° F. and not less than 140 seconds at 210° F. and a Knopf viscidity not exceeding 12-13 ounces at 0° F.

In testimony whereof we affix our signatures.

STANLEY D. WHITE.
CARL L. KNOPF.

CERTIFICATE OF CORRECTION.

Patent No. 1,831,614.  Granted November 10, 1931, to

STANLEY D. WHITE ET AL.

It is hereby certified that error appears in the printed specification of the above numbered patent requiring correction as follows: Page 6, lines 7 and 8, claim 14, strike out the words "and a MacMichael viscosity of 85-95 poises at 100° F." and insert the same before the word "and" in line 9, of same claim; and that the said Letters Patent should be read with this correction therein that the same may conform to the record of the case in the Patent Office.

Signed and sealed this 22nd day of December, A. D. 1931.

(Seal)

M. J. Moore,
Acting Commissioner of Patents.

CERTIFICATE OF CORRECTION.

Patent No. 1,831,614.  Granted November 10, 1931, to

STANLEY D. WHITE ET AL.

It is hereby certified that error appears in the printed specification of the above numbered patent requiring correction as follows: Page 6, lines 7 and 8, claim 14, strike out the words "and a MacMichael viscosity of 85-95 poises at 100° F." and insert the same before the word "and" in line 9, of same claim; and that the said Letters Patent should be read with this correction therein that the same may conform to the record of the case in the Patent Office.

Signed and sealed this 22nd day of December, A. D. 1931.

(Seal)

M. J. Moore,
Acting Commissioner of Patents.